United States Patent [19]

Dziedzic

[11] Patent Number: 5,072,301

[45] Date of Patent: Dec. 10, 1991

[54] APPARATUS AND PROCESS FOR IMLOSION PROTECTION IN CATHODE RAY TUBES

[75] Inventor: Stanislaw J. Dziedzic, Elmwood Park, Ill.

[73] Assignee: Zenith Electronics Corporation, Glenview, Ill.

[21] Appl. No.: 493,089

[22] Filed: Mar. 12, 1990

[51] Int. Cl.[5] .................................... H04N 5/65

[52] U.S. Cl. .................................... 358/245; 358/247; 313/477 R; 313/478; 313/419

[58] Field of Search .................................... 358/245, 247; 313/477 R, 477 HC, 478, 479

[56] References Cited

U.S. PATENT DOCUMENTS

| | | | |
|---|---|---|---|
| 3,879,627 | 4/1975 | Robinder | 313/116 |
| 4,204,231 | 5/1980 | Permenter | 358/247 |
| 4,329,620 | 5/1982 | Lanciano | 313/478 |
| 4,485,329 | 11/1984 | Donofrio et al. | 358/247 |
| 4,656,522 | 4/1987 | Piascinski et al. | 358/247 |
| 4,709,272 | 11/1987 | Tischer | 358/247 |
| 4,739,412 | 4/1988 | Lee | 358/247 |
| 4,841,372 | 6/1989 | Lee | 358/247 |
| 4,930,015 | 5/1990 | Dougherty et al. | 358/245 |

*Primary Examiner*—Edward L. Coles, Sr.
*Assistant Examiner*—Thomas D. Lee

[57] ABSTRACT

An apparatus and method provides for installing an implosion panel on the image-display window of an image-display device. The apparatus includes means for spacing an implosion panel from the image-display window a predetermined distance to provide a cavity therebetween. The periphery of the cavity is sealed and uncured resin is introduced in a controlled manner into the cavity while exhausting the air from the cavity. The apparatus includes means for curing the resin to bond the implosion panel to the image-display window.

22 Claims, 5 Drawing Sheets

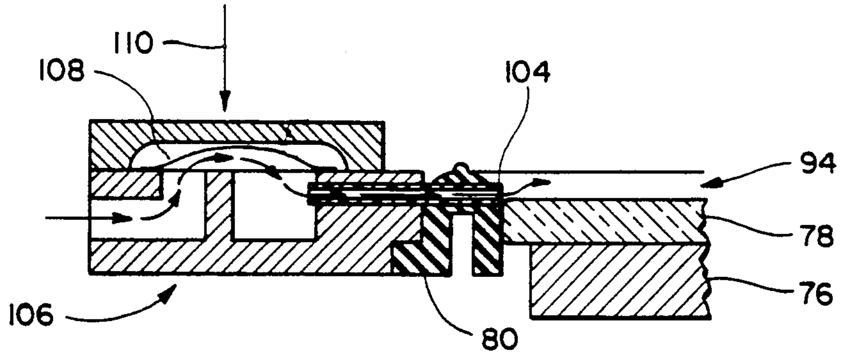
Fig. 8
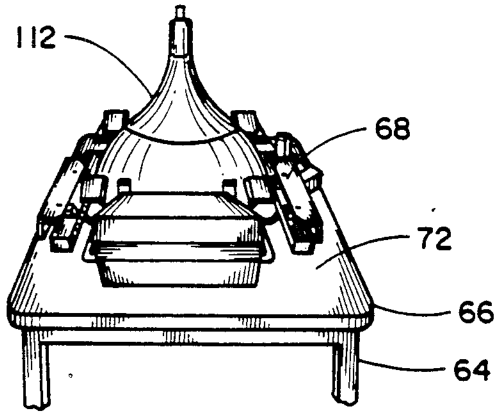
Fig. 9
Fig. 10
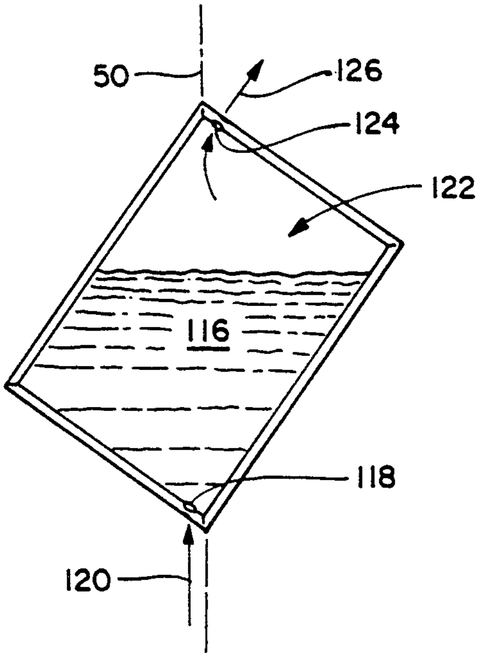

APPARATUS AND PROCESS FOR IMLOSION PROTECTION IN CATHODE RAY TUBES

FIELD OF THE INVENTION

This invention relates generally to the bonding of an implosion panel to the faceplate of a cathode ray tube, and in particular, implosion bonding of tubes of the flat tension mask type.

BACKGROUND OF THE INVENTION

The implosion that occurs upon breakage of the envelope of an evacuated cathode ray tube can be dangerous. If the faceplate is accidentally impacted, it can shatter into many fragments which may be driven into the interior of the tube envelope by atmospheric pressure. The glass fragments then rebound outwardly and can be ejected with sufficient force to cause serious injury to a person standing in front of the tube.

In the past, color television tubes have consisted of CRTs (cathode ray tubes) with convexly curved faceplates. Faceplates of this type resist external air pressure in much the same manner as an arch supports an architectural load. A band of steel under tension is applied to the periphery of the faceplate, putting the glass under compression. Effective implosion protection results in view of the fact that a blow to the faceplate results in the glass falling harmlessly, and with low velocity, into the interior of the tube Recently, a superior color CRT was invented that employs a flat faceplate in conjunction with a tensed foil shadow mask. The implosion-protection system used successfully for tubes having curved faceplates was found to be impractical when applied to tubes having a flat faceplate.

An implosion protection system suitable for tubes having a flat faceplate is fully described and claimed in U.S. Pat. Nos. 4,739,412 and 4,841,372, of common ownership herewith. A resin-bonding system is disclosed in which a implosion-protection panel is bonded to the faceplate of a cathode ray tube, and the resin is cured by ultraviolet radiation. The resin-bonding system is designed for differential adhesion such that the faceplate separates more easily from the resin than does the implosion protection panel. The two patents set forth in detail the composition of the resins and release agents, and describe a means and process on which the present invention is based.

In U.S. Pat. No. 3,879,627 to Robinder, a display tube having a neutral density filter is disclosed. A sheet of glass is placed in spaced, overlying relationship with a faceplate. A securing tape is mounted around the circumference of the two members and holds the members in a predetermined spaced relation. Heat of about 60 degree C. is applied and the space between the faceplate and panel is filled with resin, after which the final assembly is cooled and the resin is allowed to cool and set.

Other Prior Art

U.S. Pat. Nos. 4,329,620 to Lanciano and 4,709,272 to Tischer.

OBJECTS OF THE INVENTION

It is a general object of the invention to provide production means and process for an implosion-protection system for a color cathode ray tubes, in particular tubes of the flat tension mask type.

It is an object of the invention to limit the quantity of implosion-panel-bonding resin expended to the exact amount needed to bond an implosion panel to the tube faceplate.

It is another object to provide a "closed system" in which airborne particles cannot intrude into the space between the implosion panel and the faceplate.

It is a further object to prevent the entrapment and entrainment of air bubbles during the process of introducing resin into the space between the panel and the faceplate.

It is another object of the invention to provide an implosion-bonding system applicable to image display devices of all sizes and types without the need to radically alter the basic design of the implosion-bonding apparatus according to the invention.

It is yet another object of the invention to provide an implosion-bonding system in which emanation of fumes from the resin is strictly restricted during the implosion-bonding process.

BRIEF DESCRIPTION OF THE DRAWINGS

FIG. 8 is a cross-sectional view in elevation of a valving system used to introduce resin into the cavity located between a faceplate and an implosion panel.

FIG. 9 is a view similar to FIG. 3 in which a cathode ray tube is shown as installed in the apparatus of FIG. 3 in preparation for the implosion-bonding process according to the invention; and FIG. 10 is a simplified diagrammatic view depicting the introduction of resin according to the invention into the aforedescribed cavity.

DESCRIPTION OF THE PREFERRED EMBODIMENT

Figure 1:
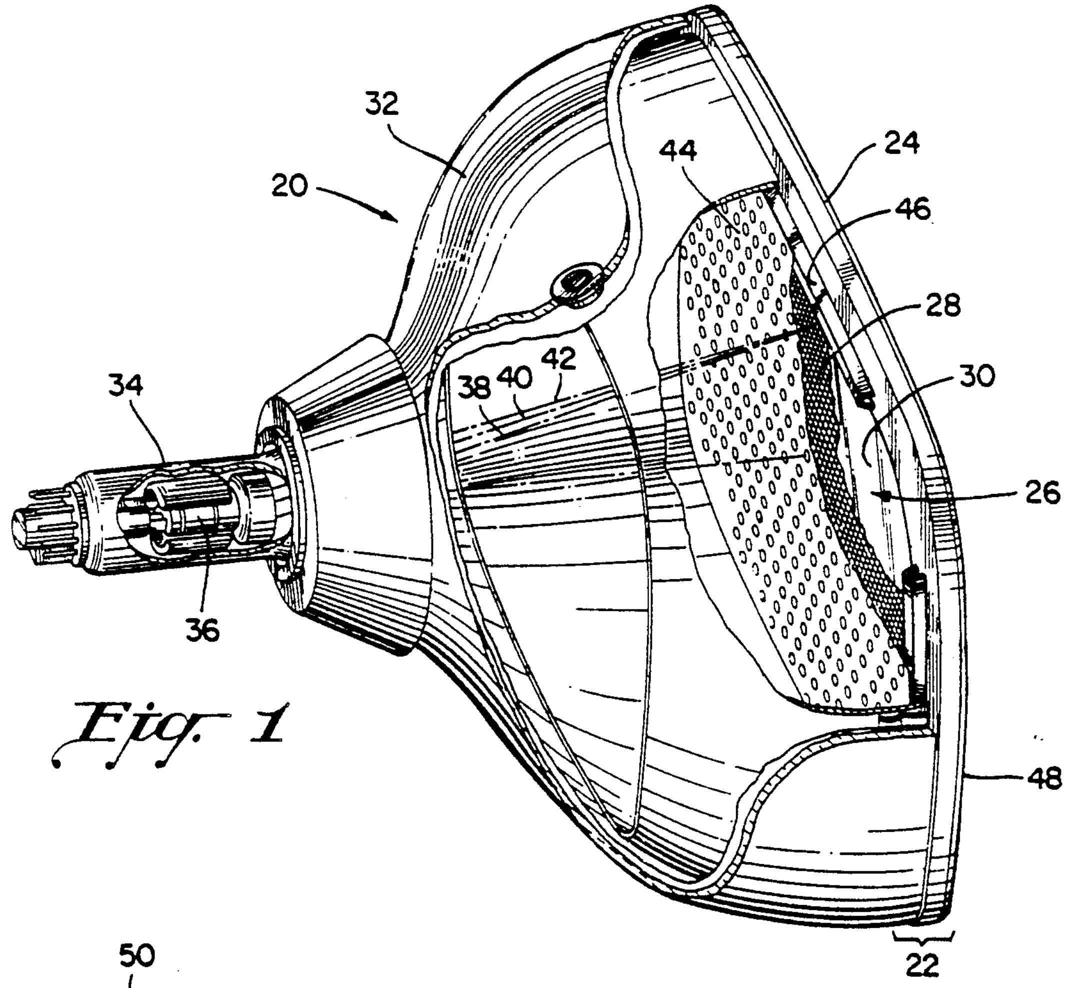
FIG. 1 is a view in perspective depicting a flat tension mask color cathode ray tube having an implosion panel installed by the means and method of the present invention; cutaway sections indicate the interrelationship of the major components of the tube.

With reference to FIG. 1, there is depicted a color cathode ray tube 20 having a tensed foil shadow mask.

The front assembly 22 of the tube 20 comprises a faceplate 24 having on its inner surface 26 a screen 28 made up of red-light emitting, green-light-emitting, and blue-light-emitting phosphors deposits. The phosphor deposits of screen 28 are coated with a film of aluminum 30 of having a thickness in microns; film 30 provides for reflecting light emitted by the phosphor deposits toward the viewer, and by its conductivity, provides for charging screen 28 with an anode electrode potential in the range of 20 to 30 kilovolts, with the magnitude of the voltage depending on the size of the tube.

Faceplate 24 is joined with a funnel 32 which terminates in a neck 34 housing and an electron gun 36. Electron gun 36 emits three beams 38, 40 and 42 for energizing the phosphor deposits in passing through an intercessory electrode known as the shadow mask 44, which serves as a parallax barrier. Shadow mask 44 ensures that the each of the three beams 38, 40 and 42 will fall only on its assigned phosphor deposits on screen 28, producing a color image. A mask support structure 46 that encloses screen 28 provides for receiving and securing shadow mask 44.

Figure 1A:
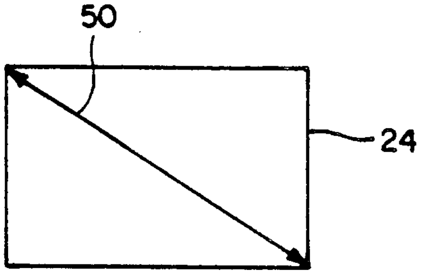
FIG. 1A indicates diagrammatically the diagonal measure of the faceplate of the cathode ray tube.

FIG. 1A depicts faceplate 24 schematically, with the diagonal 50 of the faceplate 24 indicated. The diagonal is a means for indicating the orientation of the faceplate in this disclosure, and for indicating the size of the tube. For example, a 14-inch cathode ray tube having dimensions of 10.69 inches high by 13.44 inches wide is said to have a diagonal measure of 14 inches.

Front assembly 22 includes an implosion-protection system 48 which serves to prevent injury to persons viewing the image if the tube should implode. A implosion-protection is usually necessary in image display devices which have a high internal vacuum, such as a cathode ray tube.

Figure 2:
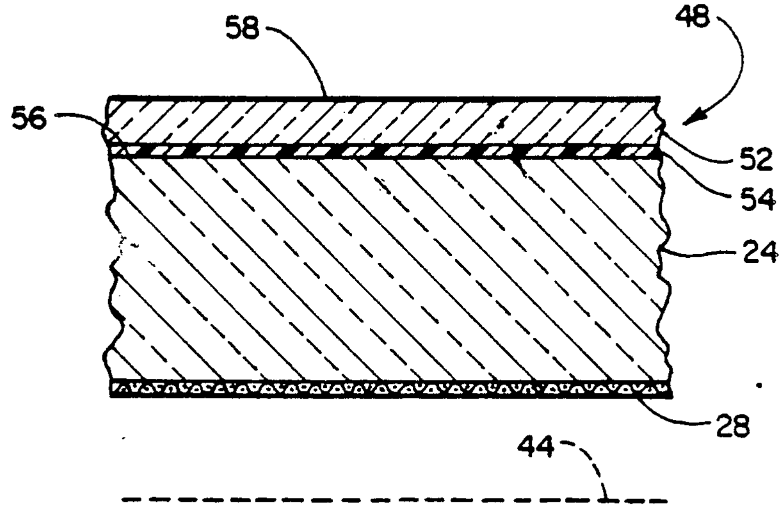
FIG. 2 is an cross-sectional view in elevation of the front assembly of the tube of FIG. 1 that depicts diagrammatically the structure of an implosion panel as bonded to a faceplate by means of the present invention.

The structure of the implosion-protection system 48 in relation to the faceplate 24 is shown in greater detail in FIG. 2. Implosion-protection system 48 is depicted as comprising a relatively thin panel of glass, termed an "implosion panel" in this discolsure. Implosion panel 52 is indicated as being bonded to the front surface 54 of faceplate 24 by a layer of resin 56.

The glass of implosion panel 52 is inherently more flexible than the glass of the relatively thick faceplate 24. Implosion panel 52 preferably comprises a commercially available sheet of double-strength glass having a thickness of about one-eighth of an inch. Implosion panel 52 is noted as having a surface treatment 58 effective in restricting reflection of ambient light. Implosion panel 52 may as well comprise a sheet of transparent plastic according to the invention.

The composition of the UV-curable resin is set forth in the referent '372 and '412 patents, noted as being of common ownership herewith. (Please refer to Table I of the '372 patent.) According to the '372 patent, the resin may include a neutral density contrast-enhancing soluble organic dye in a solvent that is chemically reactive with the resin.

Faceplate 24 is noted as having a release agent coated on its outer surface 54. The effect of the release agent is to cause the resin to adhere less strongly to the glass of the faceplate 24, thus achieving the objective of "differential adhesion" described and claimed in the referent '372 and '412 patents.

Figure 3:
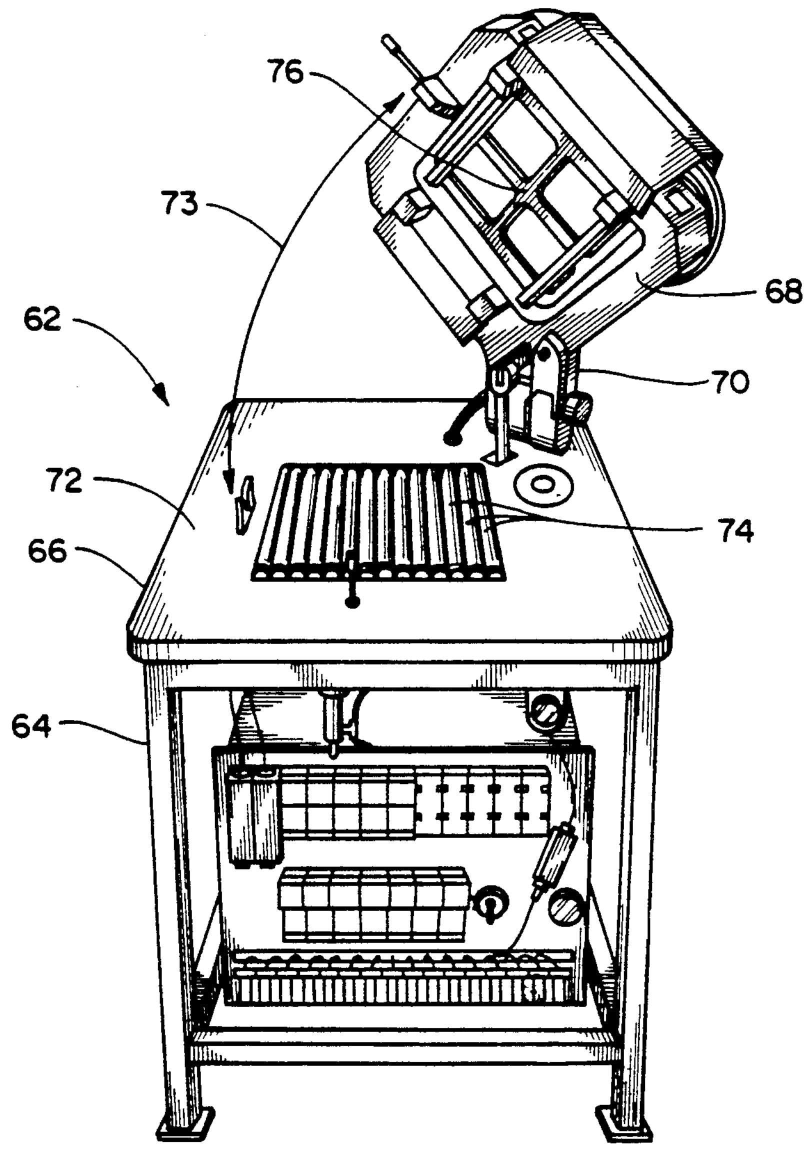
FIG. 3 is a simplified perspective view in elevation of a machine according to the invention for bonding a implosion panel to the faceplate of a flat tension mask color cathode ray tube, and depicting a CRT holding frame in an elevated position.

With reference to FIG. 3, there is shown an implosion-panel-installation apparatus according to the invention for implosion-bonding a flat tension mask color cathode ray tube. Apparatus 62 is depicted as consisting of a stand 64 supporting a table 66. A CRT holding frame 68 is shown in its upright position; CRT holding frame 68 is supported by a hinge 70 which provides for rotating frame 68 to the position shown, and returning frame 68 to rest on the surface 72 of table 66; the path of frame 68 in its traverse from the surface 72 of table 66 to its vertical position as indicated by the arrow 73. Frame 68 provides for holding and orienting a cathode ray tube during the inventive implosion-bonding process, as will be described.

Recessed into the surface 72 of table 66 is an array 74 of ultra-violet-light-emitting bulbs which provide for partially curing the resin according to the invention during the implosion-bonding process.

An implosion-panel support platform means 76, noted as being removable, provides for the temporary support of an implosion panel. Platform 76 provides for receiving and implosion panel of variable thickness, and includes means for moving a panel up and down, and fixing it in place with respect to frame 68. Platform 76 can also be removed from frame 68, as will be described.

Figure 4:
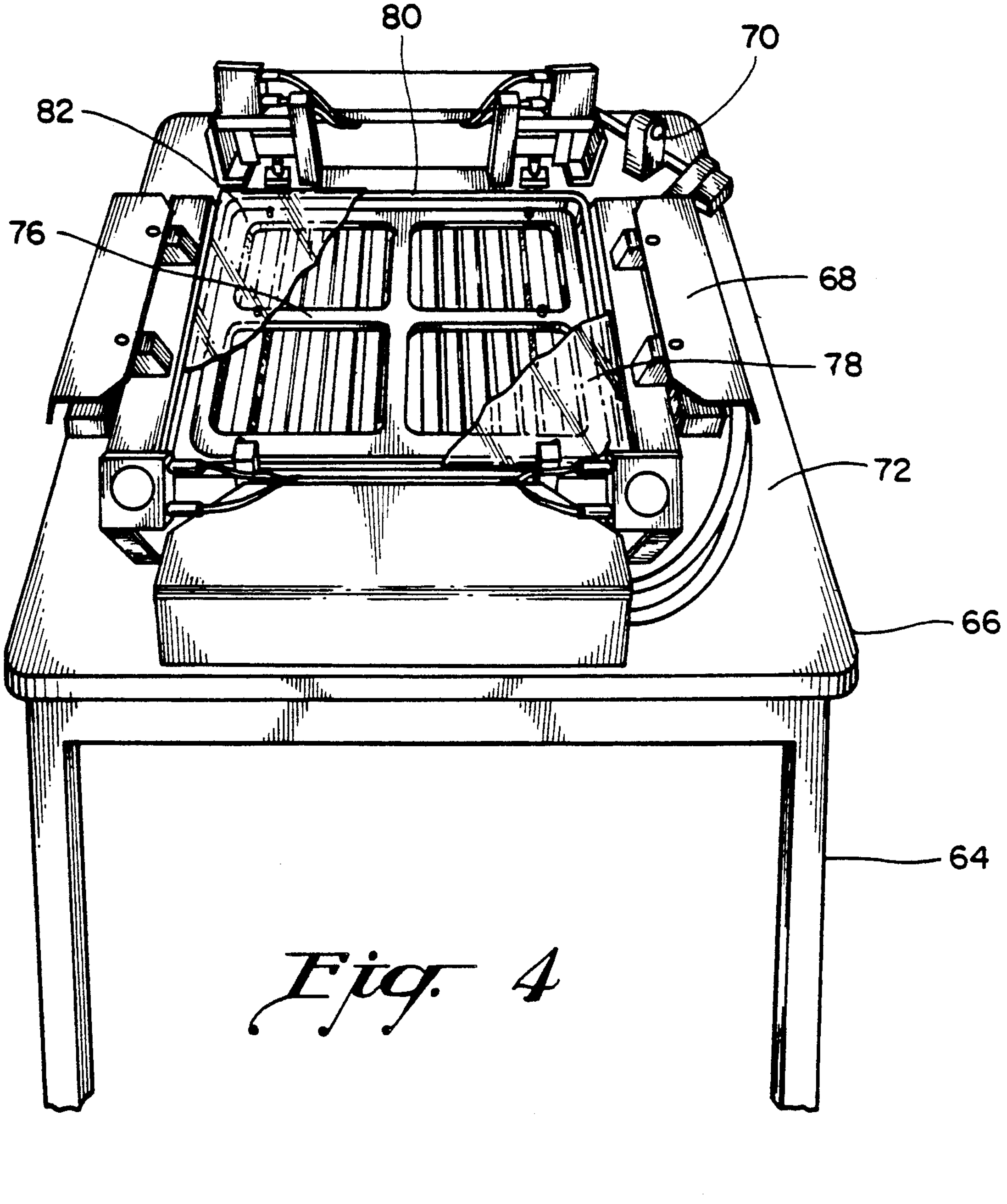
FIG. 4 is a view similar to FIG. 3 showing details of a holding frame used in implosion-bonding a cathode ray tube according to the invention; the CRT holding frame of FIG. 3 is shown in a lowered position.

With reference now to FIG. 4, CRT holding frame 68 is shown in its lowered position, in which it rests on surface 72 of table 66, and ready to receive a cathode-ray tube to be implosion-bonded according to the invention. In preparation for the implosion-bonding process, platform 76 is shown as supporting an implosion panel 78, noted as comprising a sheet of commercially available, double-strength glass by way of example. The surface of panel 78 that has been treated to inhibit reflection of ambient light (please see reference No. 58 of FIG. 2) is placed against platform 76.

A gasket 80, noted as being reusable according to the invention, is indicated as being disposed around the periphery of implosion panel 78.

Figure 5:
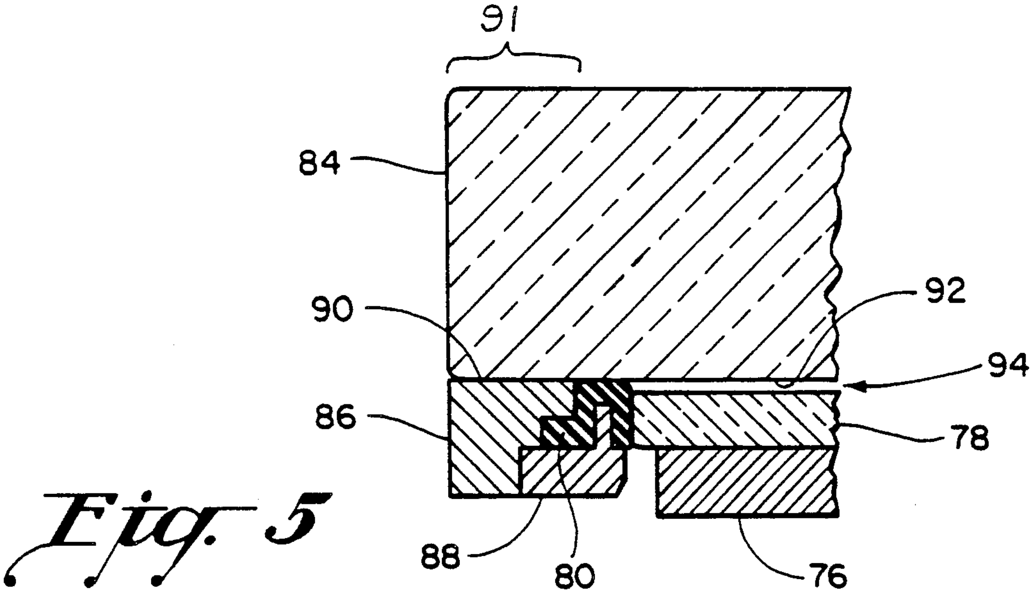
FIG. 5 is a cross-sectional, partial view in elevation of a faceplate assembly depicting details of the interface of the faceplate, an implosion panel, and a reusable gasket used for sealing the cavity formed in the assembly.

FIG. 5 depicts the details of an in-process assembly comprising gasket 80, platform 76—indicated as supporting implosion panel 78—and a faceplate 84 during the implosion-bonding process according to the invention. Sections 86 and 88 constitute portions of frame 68; section 86 provides stop means 90 for receiving the peripheral rim 91 of the face of faceplate 84, as indicated, while section 88 provides for supporting gasket 80, also as indicated, and noted as being installed peripheral to the assembly. Implosion panel 78 is indicated as being spaced a predetermined distance from the front surface 92 of faceplate 84, forming a cavity 94 which provides for receiving the resin in its uncured state. The predetermined distance provided by the cavity is preferably 0.015 inch.

The commercially available, double-strength glass that comprises the implosion panel varies in thickness ±0.020 inch. The apparatus according to the invention provides means for compensating for variance in thicknesses of the glass used for implosion panels to ensure that cavity 94 is always the same depth.

Figure 6:
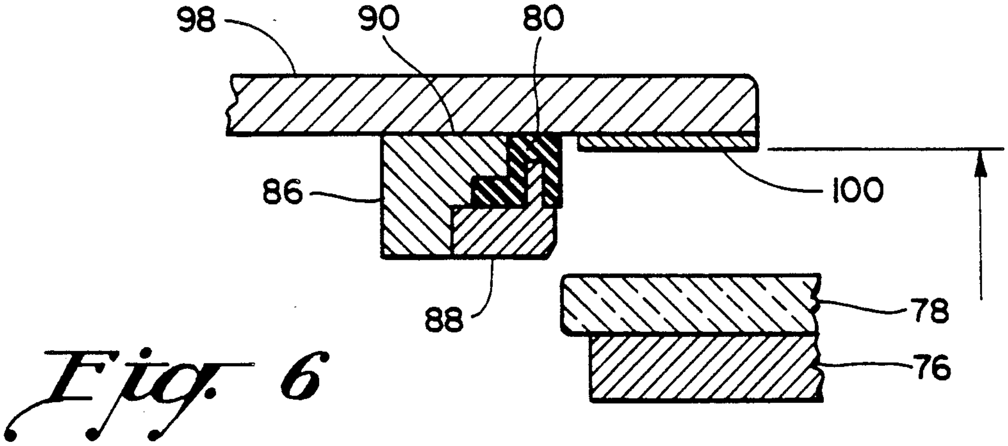
FIG. 6 is a view similar to FIG. 5 but with parts separated to show details of means for compensating according to the invention for variances in thicknesses of the glass used for implosion panels.

Compensation for variance in thicknesses of the glass is accomplished by the apparatus according to the invention as follows. Section 86 has been noted as having stop means 90 for receiving the peripheral rim 91 of the front of faceplate 84. With additional reference to FIG. 6, faceplate 84 is indicated as having been withdrawn from stop means 90, and platform 76 is shown as having been retracted from the position shown in FIG. 5. Platform 76 according to the invention provides for receiving an implosion panel of variable thickness and moving the implosion panel to define a cavity for receiving the resin by means of shimming means 98. Shimming means 98, which can be put into the position indicated either manually or automatically, then withdrawn, is shown as resting on stop means 90 of section 86. Shimming means 98 is depicted as having a gauging member 100 which, when shimming means 98 is resting on stop means 90, depends below stop means 90 the desired thickness of the cavity 94. Platform 76 is then moved upwardly in the direction indicated by arrow 102 until implosion panel 78 is in contact with gauging member 100. Platform 76, which includes means for fixing it into position, is locked in the position indicated and shimming means 98 is withdrawn. A cathode ray tube is loaded into frame 68 and lowered until the peripheral rim 91 of its faceplate 84 makes contact with stop means 90, as indicated by FIG. 5. It is thus that the cavity formed between the faceplate and the implosion panel is of uniform depth according to the invention despite variance in the thicknesses of the commercially available glass used for implosion panels.

Figure 7:
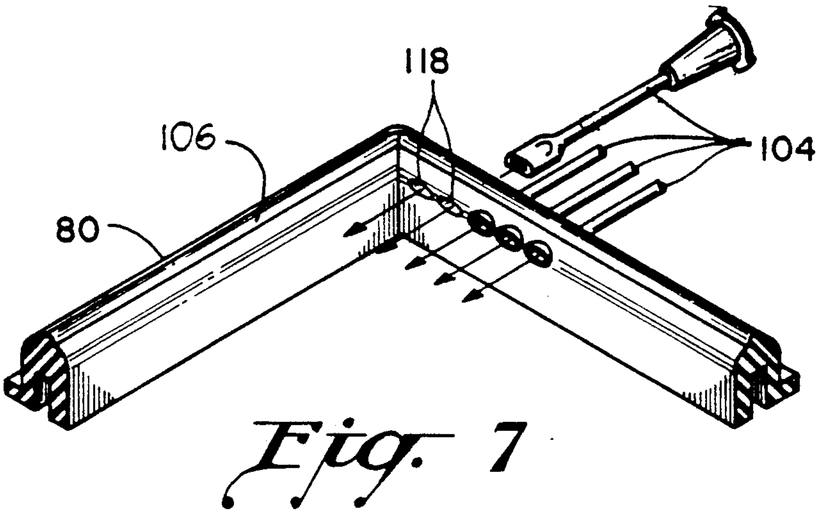
FIG. 7 is a detail view in perspective showing a corner section of reusable gasket means according to the invention.

Uncured resin is introduced into cavity 94 through at least one orifice in reusable gasket 80, and entrapped and entrained air is released through at least one oppositely located orifice in gasket 80. FIG. 7 depicts a corner section of reusable gasket 80. Five orifices are shown, and indicated as comprising metal tubes 104 pushed through holes 105 formed in gasket 80; one of the tubes 104 is are shown as withdrawn from holes 118 to indicate the formation of the tube ends that pass through gasket 80. Resin flows into cavity 94 as indicated by the associated arrows. An opposed portion of gasket 80 (not shown) may have an equivalent number of orifices and tubes for releasing air from the cavity 94 as the cavity is filled. Ridge 106 provides for pressing against the glass of the in-process faceplate to seal the cavity formed. The reusable gasket is flexible as it is molded from silicone rubber, preferably "Silastic E RTV" supplied by Dow Corning, Buffalo Grove, Ill. Tubes 104 comprise thin metal having a diameter of about 0.135 inch; the ends are crimped manually by pliers as indicated for insertion in holes 118 in gasket 80.

FIG. 8 depicts a valving system 107 for introducing resin into cavity 94 through tubes 104 located in the corner section of gasket 80 (shown by FIG. 7). The path of the resin as routed from a supply of uncured resin (not indicated) is indicated by the arrows. When cavity 94 is filled, the resin supply is cut off by pressure on flexible member 108, as indicated by arrow 110.

FIG. 9 depicts an in-process cathode ray tube 112 installed in the implosion-panel-installation apparatus 62. Frame 68 is shown as having been lowered to the surface 72 of table 66. The peripheral rim 91 of faceplate 84 is now in contact with stop means 90 as depicted in FIG. 5. The periphery of the cavity 94 formed between the faceplate 84 and the implosion panel 78 is sealed by the reusable gasket 80 according to the invention, forming a substantially closed window-implosion-panel assembly. By rotating frame 68 upwardly into the position indicated by FIG. 3, the assembly is then oriented such that the diagonal 50 of the assembly (indicated by the diagonal 50 of FIG. 1A) is substantially elevated relative to a horizontal plane.

FIG. 10 shows diagrammatically the orientation of the substantially closed faceplate-implosion panel assembly 114 when so elevated. In a controlled manner, uncured resin 116 is introduced into the lower portion of the cavity 94 formed between the faceplate 84 and the implosion panel 78 through at at least one orifice 118, while causing the air within the cavity to exit from at least one oppositely located orifice, shown as being located in the upper poriton of cavity 94. The flow of resin in entering cavity 94 is indicated by arrow 120, and air in the unfilled space 122 exits through at least one oppositely located orifice 124 as indicated by arrow 126. The introduction of the resin is such that resin flows into the cavity according to the invention without entrapment or entrainment of air bubbles in the resin. An optical sensor (not indicated) located near orifice 124 senses the level of fill and actuates the shut-off diaphragm 108 of valving system 107 described in connection with FIG. 8.

The appartus according to the invention may include means for exhausting air from the cavity through the opposed portion of the cavity, such as through orifice 124 indicated in FIG. 10, to accelerate entry of the uncured resin. A vacuum pump may be used for this purpose. It is noted that only a slight vacuum must be used as the glass of the implosion panel is somewhat flexible and may assume a concave shape if too low a pressure in applied.

When cavity 94 is filled with uncured resin, panel support platform 76 (see FIG. 3) is removed. The window-implosion panel assembly 114 is held in the proper conjunction by gasket 80. Frame 62 is then lowered to the position shown by FIG. 9. In this position, the substantially closed window-implosion-panel assembly 114 is exposed to the array 74 of ultra-violet-emitting bulbs to partially cure the resin. Exposure time is preferably about 15 seconds. The tube is withdrawn from CRT holding frame 68, releasing the gasket from its peripheral contact with the faceplate and implosion panel, thus unsealing the cavity 94. The partially cured resin provides enough adhesion to make it possible to remove the tube from the frame without separation of the implosion panel from the faceplate. The tube 112 is then removed, according to the invention, to a position where the faceplate is exposed to a separate array of higher power ultra-violet-light-emitting bulbs (not shown) to final-cure the resin.

The sequence of curing the resin according to the invention includes first partially curing the resin while it is in-place in apparatus 62, unsealing the cavity 94, moving the in-process tube 112 to a separate location, and there final-curing the resin by means of the array of higher power ultra-violet-light-emitting bulbs described. The UV-emitting bulbs used in partially curing the resin and incorporated into apparatus 62 (indicated by array 74 in FIG. 3), are preferably those having the designation "F8TV", provided by General Electric Supply Company of Elmhurst, Ill. The higher power bulbs in the separate location may comprise an array provided by Fusion UV Curing System of Buffalo Grove, Ill. under the designation "F450-20 UV Curing System." Other UV sources providing equivalent characteristics may as well be used.

To ready the implosion-panel-installation apparatus 62 for receiving another cathode ray tube to be fitted with an implosion panel, the panel support platform 76 is reinstalled in frame 68, frame 68 is lowered to table 66, an implosion panel (indicated by reference number 78 in FIG. 4) is placed on platform 76, and another cathode ray tube is placed in frame 68.

Dimensions of Major Components, in Inches

Faceplate of a 14-inch tube (diagonal measure): 10.69 H×13.44 W×0.5 D (thick)

Implosion panel for 14-inch tube: 9.63 H×12.5 W×0.125 D (thick). As noted, the depth, or thickness of such glass, may vary about 0.02 inch.
Support frame: 8.75 H×11.5 W×0.5 D
Gasket: 10 H×12⅝W×0.5 D
Volume of resin in cavity: About 1.8 cubic inches Resin Cure Rates Time of partial cure, by a UV-array in apparatus according to the invention: about 15 seconds
Time of final cure, in a separately located higher-power UV array: about 45 seconds.

The rate at which the resin will enter the cavity formed between an implosion panel and a faceplate depends upon its viscosity. For example, if resin viscosity is 800 CPU, filling of the cavity will require about four minutes. If resin viscosity is 200 CPU, the cavity will fill in about 30 seconds, a much more acceptable rate in terms of production efficiency.

In addition to the flat tension mask cathode ray tube described in connection with the present application, the apparatus and method according to the invention may find use in the implosion-protection of many kinds of high-vacuum image display devices having an display window and an implosion panel thereover. An example is the conventional cathode ray tube having a curved faceplate and domed shadow mask. Another example is a flat image display tube that utilizes the plasma sac technology described in U.S. Pat. No. 4,227,114, "Cathodoluminescent Gas Discharge Image Display Panel," of common ownership herewith.

The implosion-panel installation apparatus according to the invention may as well be designed to implosion-bond other sizes and types of display devices in which implosion is a hazard because of a high internal vacuum. Scaling up or down in size of the apparatus, along with a minor redesign of the components shown by the foregoing figures is all that would be required. Further, the implosion-protection system according to the invention could be used as well to shield the faceplate of an image display device (not necessarily a high-vacuum device), in which the faceplate is particularly vulnerable to damage from impact or or other traumatic effect, such as the presence of a corrosive atmosphere.

The benefits attained by the implosion bonding system according to the invention include:

(a) No resin fumes can escape from the sealed system;

(b) No airborne particles can enter the cavity;

(c) No waste of expensive resin;

(d) One person can operate more than one implosion-bonding apparatus;

(e) No air bubbles are entrapped or entrained in the resin;

(f) The basic apparatus can be readily adapted to all types and sizes of image display devices.

A further benefit of the implosion bonding system is that, if a defect is discovered in the resin after its final curing such as the presence of a foreign particle, the resin and attached safety panel can be readily lifted off the faceplate due to the presence of the aforedescribed release agent. Separation is accomplished by a simple wedging tool between the resin layer and the faceplate. Since tubes subject to the implosion-bonding process have passed through the final stages of manufacture (that is, they have been screened, sealed and tested and therefore much production time and money has been expended in their manufacture), they can be easily salvaged, and the only further production step is recycling through the implosion-bonding process.

While a particular embodiment of the invention has been shown and described, it will be readily apparent to those skilled in the art that changes and modifications may be made in the inventive apparatus and method without departing from the invention in its broader aspects, and therefore, the aim of the appended claims is to cover all such changes and modifications as fall within the true spirit and scope of the invention.

I claim:

1. A method of manufacturing an image display device having an image display window and an implosion panel thereover, comprising:

spacing said implosion panel from said window a predetermined distance to provide a cavity therebetween;

using reusable gasket means to seal the periphery of said cavity;

in a controlled manner, introducing uncured resin into said cavity while causing the air within the cavity to exit from an opposed portion thereof, such that said resin flows into said cavity without entrapment or entrainment of air bubbles in the resin; and curing said resin to bond said implosion panel to said window.

2. The method according to claim 1 including introducing said uncured resin into said cavity through at least one orifice in said gasket means, and releasing entrapped and entrained air through at least one oppositely located orifice in said gasket means.

3. The method according to claim 2 including applying a vacuum on said oppositely located orifice to accelerate entry of said resin into said cavity.

4. The method according to claim 1 including first partially curing said resin, unsealing said cavity, and then final-curing said resin.

5. A method of manufacturing a high-vacuum image display device having a rectangular image display window and an implosion panel thereover comprising:

spacing said implosion panel from said window a predetermined distance to provide a cavity therebetween;

sealing the periphery of said cavity to form a substantially closed window-implosion-panel assembly;

orienting said assembly such that a diagonal of said assembly is substantially elevated relative to a horizontal plane;

in a controlled manner, introducing uncured resin into the bottom of said cavity while causing the air within the cavity to exit from a top portion thereof; and curing said resin to bond said implosion panel to said window.

6. A method of manufacturing an image display device having a rectangular image display window and an implosion panel thereover comprising:

spacing said implosion panel from said window a predetermined distance to provide a cavity therebetween;

sealing the periphery of said cavity with reusable gasket means providing for a substantially closed window-implosion-panel assembly;

orienting said assembly such that a diagonal of said window is substantially elevated relative to a horizontal plane;

in a controlled manner, introducing uncured resin into at least one orifice in said gasket means located in a lower portion of cavity while causing the air within the cavity to exit from at least one oppositely located orifice in the upper portion thereof, such that said resin flows into said cavity without entrapment or entrainment of air bubbles in the resin;

first partially curing said resin, unsealing said cavity, and then final-curing said resin.

7. The method of claim 6 including applying a vacuum on said oppositely located orifice to accelerate entry of said resin into said cavity.

8. An apparatus for installing an implosion panel on the image-display window of an image-display device, comprising:

means for spacing said implosion panel from said window a predetermined distance to provide a cavity therebetween;

reusable gasket means for sealing the periphery of said cavity;

means for introducing in a controlled manner uncured resin into said cavity, including means for exhausting the air with the cavity from an opposed portion thereof;

means for curing said resin to bond said implosion panel to said window.

9. The apparatus according to claim 8 wherein said gasket means has at least one orifice for introducing uncured resin into said cavity, and at least one oppositely located orifice for releasing air entrapped in said cavity.

10. The apparatus according to claim 8 wherein said apparatus includes ultraviolet light means for curing said resin.

11. The apparatus according to claim 8 wherein said apparatus utilizes commercially available, double-strength glass for said implosion panel.

12. The apparatus of claim 11 wherein said apparatus provides for compensating for variance in thicknesses of said panels to provide a uniform cavity width.

13. The apparatus according to claim 8 wherein said apparatus utilizes a transparent plastic for said implosion panel.

14. An apparatus for installing an implosion panel on a rectangular image-display window of an image display device, comprising:

means for spacing an implosion panel from said window a predetermined distance to provide a cavity therebetween;

means for sealing the periphery of said cavity to provide a substantially sealed implosion-panel-window assembly;

means for orienting said assembly such that the diagonal of said assembly is substantially elevated relative to a horizontal plane;

means for introducing in a controlled manner uncured resin into a lower portion of said cavity, including means for exhausting the air within the cavity from an opposed portion thereof; and means for curing said resin to bond said implosion panel to said window.

15. The apparatus according to claim 14 wherein said means for sealing said cavity comprises reusable gasket means installed peripheral to said assembly.

16. The apparatus according to claim 14 wherein said gasket means has at least one orifice for introducing uncured resin into said cavity, and at least one oppositely located orifice for releasing air entrapped in said cavity.

17. The apparatus according to claim 14 wherein said apparatus includes ultraviolet light means for curing said resin.

18. The apparatus according to claim 14 where said apparatus utilizes commercially available, double-strength glass for said implosion panel.

19. The apparatus of claim 18 wherein said apparatus provides for compensating for variance in thicknesses of said glass to provide a uniform cavity width.

20. The apparatus of claim 14 wherein said apparatus utilizes a transparent plastic for said implosion panel.

21. The apparatus of claim 14 including means for partially exhausting air from said cavity through said opposed portion thereof.

22. An implosion-panel-installation apparatus for use in the manufacture of color cathode ray tube having a faceplate with an imaging screen, said apparatus including means for providing a cavity between said faceplate and an implosion panel applied thereover, and means for compensating for variance in thicknesses of implosion panels, the apparatus comprising:

stop means for receiving and seating a peripheral rim portion of said faceplate;

shim means for resting on said stop means and having a gauging member depending below said stop means, said gauging member having a predetermined thickness equal to the desired thickness of said cavity;

support means for receiving an implosion panel and for moving said implosion panel into contact with said gauging member to define a cavity having said predetermined thickness for receiving said resin, including means for fixing said support means in place; and means for withdrawing said shim means and lowering said faceplate onto said stop means.

* * * * *